(12) United States Patent
Chesley

(10) Patent No.: US 6,708,201 B1
(45) Date of Patent: Mar. 16, 2004

(54) GOAL-DIRECTED ASYNCHRONOUS MESSAGING SYSTEM

(75) Inventor: Harry R. Chesley, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 644 days.

(21) Appl. No.: 09/607,076

(22) Filed: Jun. 29, 2000

(51) Int. Cl.⁷ ............................................. G06F 15/16
(52) U.S. Cl. ...................................................... 709/205
(58) Field of Search ................................ 709/205, 201, 709/204

(56) References Cited

U.S. PATENT DOCUMENTS

| | | | |
|---|---|---|---|
| 5,627,997 A | * 5/1997 | Pearson et al. | 709/206 |
| 5,930,471 A | * 7/1999 | Milewski et al. | 709/207 |
| 6,460,096 B1 | * 10/2002 | Hesse et al. | 710/56 |
| 6,487,548 B1 | * 11/2002 | Leymann et al. | 707/3 |

OTHER PUBLICATIONS

Jeff Conklin and Michael L. Begeman, MCC, Software Technology Program, article entitled gIBIS: A Hypertext Tool for Exploratory Policy Discussion, ACM Transactions on Office Information System, vol. 6, No. 4, Oct. 1985, pp. 303–331.

J. Oikarinen and D. Reed memo dated May 1993 regarding Internet Relay Chat Protocol, 58 pages.

Fernando Flores, Michael Graves, Brad Hartfield and Terryj Winograd article entitled Computer Systems and the Design of Organizational Interaction, ACM Transactions on Office Information System, vol. 6, No. 2, Apr. 1988, pp. 153–172.

Beverly I. Kedzierski, Reading 10, "Communication and Management Support in System Development Environments", Computer–Supported Cooperative Work: A Book of Readings.

Thomas W. Malone, Kenneth R. Grant, Kum–Yew Lai, Ramana Rao and David Rosenblitt, Reading 12, "Semistructured Messages are Surprisingly Useful for Computer–Supported Coordination", Computer–Supported Cooperative Work: A Book of Readings.

Irene Greif and Sunil Sarin, Reading 17, "Data Sharing in Group Work", Computer–Supported Cooperative Work: A Book of Readings.

Robert H. Thomas, Harry Forsdick, Terrence R. Crowley, Richard W. Schaaf, Raymond S. Tomlinson, Virginia M. Travers and George G. Robertson, Reading 18, "Diamond: A Multimedia Message System Built on a Distributed Architecture", Computer–Supported Cooperative Work: A Book of Readings.

* cited by examiner

*Primary Examiner*—David Y. Eng
(74) *Attorney, Agent, or Firm*—Watts Hoffmann Co., L.P.A.

(57) ABSTRACT

A method of facilitating a discussion consisting of an exchange of electronic messages between members of a team including a team leader in a computer messaging system having messages that are arranged into a message hierarchy wherein related messages are represented by nodes and associated sub-nodes. A means for the leader to assign a node type to at least one of the nodes is provided. The node type is chosen from a set of discussion stages ranging from an initial stage to a final stage. A response framework is determined based on the assigned type. A response from a member is directed by evaluating a proposed response of the member based on the response framework and alerting the member if the proposed response is not proper based on the evaluation. The message hierarchy associated with a message being viewed by a team member is displayed and the display includes information about where the message being viewed fits into the message hierarchy.

29 Claims, 6 Drawing Sheets

|  | OPEN | ENUMERATE | BRAINSTORM | DISCUSS | SURVEY | CHOOSE | SUMMARIZE | DECIDE | CLOSE |
|---|---|---|---|---|---|---|---|---|---|
| ITEM |  |  |  |  |  |  |  | NO CHANGE | NO CHANGE |
| THREAD |  |  |  |  |  |  | NO ADD | NO CHANGE | NO CHANGE |
| LIST |  |  | NO REMOVE | NO REMOVE | NO REMOVE | NO ADD OR REMOVE | NO ADD OR REMOVE | NO CHANGE | NO CHANGE |
| Q & A |  |  | NO REMOVE | NO REMOVE | NO ADD | NO ADD | NO VOTE | NO CHANGE | NO CHANGE |
| SUMMARY |  |  | NO CREATE | NO CREATE | NO CREATE | NO CREATE |  | NO CHANGE | NO CHANGE |
| DECISION | NO CREATE | NO CREATE | NO CREATE | NO CREATE | NO CREATE | NO CREATE |  |  | NO CHANGE |

Fig.6

GOAL-DIRECTED ASYNCHRONOUS MESSAGING SYSTEM

TECHNICAL FIELD

The present invention concerns the field of hierarchical messaging systems. More particularly, the present invention concerns a goal-directed asynchronous messaging system.

BACKGROUND OF THE INVENTION

Work teams, families, and small social groups are the unit of society where the individuals actually interact, repeatedly encountering and engaging each other. In a work team, the needs of the individual interface with those of the organization. Accomplishing a task or goal may be the focus, but the experience of teamwork rests heavily with the interaction between the members, even if the membership frequently changes or if members rarely have face-to-face contact. Through interaction information is shared, decisions are made and communicated, and members meet social needs. Social interaction, as a fundamental process (as opposed to the socializing between friends) plays a major part of team life.

Goals and purpose are part of what continually motivate the individual and gives meaning to the task. They enhance member identity and sustain the individual's commitment to something larger than self. The meaningfulness of the task to the individual is believed to have a significant impact on performance as well as the emotional life and interaction of group members. In this sense, goals and purpose are part of the sustaining structure of team social interactions. Work process, or how the work is done, is a blend of technology, materials, knowledge and interaction. Each individual part of the work process needs to be linked to overall group goals and purpose in order for it to be of meaning.

In traditional meetings, where all members are physically present, maintaining focus and bringing the discussion to an eventual conclusion is done by a moderator. More and more, however, computers are becoming the primary means for person-to-person communication, especially in business settings. Existing computer discussion systems are undirected and open-ended. They facilitate discussion, but do not encourage it to move in a particular direction.

SUMMARY OF THE INVENTION

The present invention provides a method for directing discussion in the form of electronic messages exchanged between the members of a team. The messages are arranged in a hierarchy having nodes and related sub-nodes that represent the messages. In one embodiment, a message requiring a response is represented by a node while the responses to that message are represented as its sub-nodes. A team leader assigns a node type to a node from a set of node types. Each type requires a different set of appropriate responses to the node.

In an embodiment, the node type is chosen based on the stage or mode of discussion that may take place as a project moves toward completion. Based on the assigned type, the method of the present invention directs member's response to the message represented by the node by limiting the operations a member may perform in their response. For example, early on in a project discussion might be relatively open-ended such as in a brainstorming session. A node at this point in the discussion would allow numerous operations to be performed in response. As the discussion progresses, a list of feasible solutions may be established from which a member should choose without adding additional ideas. Such a node would require a member to select from the existing set of options without adding to the list.

The team leader changes the node type as the project progresses to a final decision stage. The present invention thereby assists the team leader in moderating discussion by limiting the responses of members to ones that are appropriate for the stage of the project.

In accordance with the present invention a method directs discussion in the form of electronic messages between members of a team. The method may be implemented in the form of program modules or computer-executable instructions stored on a computer readable medium.

The present invention provides a method of directing discussion in the form of electronic messages between members of a team as the discussion progresses toward a predetermined goal. The messages are arranged into a message hierarchy wherein related messages are represented by nodes and associated sub-nodes. A response framework is provided for responding to at least one of the messages represented by the nodes and associated sub-nodes. The framework includes recommended and/or discouraged response actions that are communicated to a team member responding to the node. The team leader can modify the response framework as the discussion progresses toward the predetermined goal.

In an exemplary embodiment of the present invention, a message requiring a response is represented by a node and the associated sub-nodes of the node represent response to the node. According to a feature of the present invention, the team leader assigns a node goal to the nodes and associated sub-nodes and the response framework is based on the assigned node goal. According to another feature of the invention, the leader also assigns a node type to the node, and this determines how the message represented by the node fits into the message hierarchy.

In one embodiment of the present invention, the response framework is communicated by a pop-up screen that indicates that a proposed response is not a recommended response action. The message hierarchy is displayed with a message including an indication of where in the hierarchy the message is located. According to a feature, bookmarks may be created that link a member to nodes that have been updated since the member last viewed the hierarchy. The response framework is made up of a set of appropriate types of responses to a message. The appropriate types of responses are set by the leader based on a stage of a discussion as it progresses from an initial stage to a final stage. In an exemplary embodiment, the present invention interfaces with external program timing systems to provide updates to the project timing or communicate timing goals to member.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE PREFERRED EMBODIMENT

Exemplary Operating Environment

Figure 1:
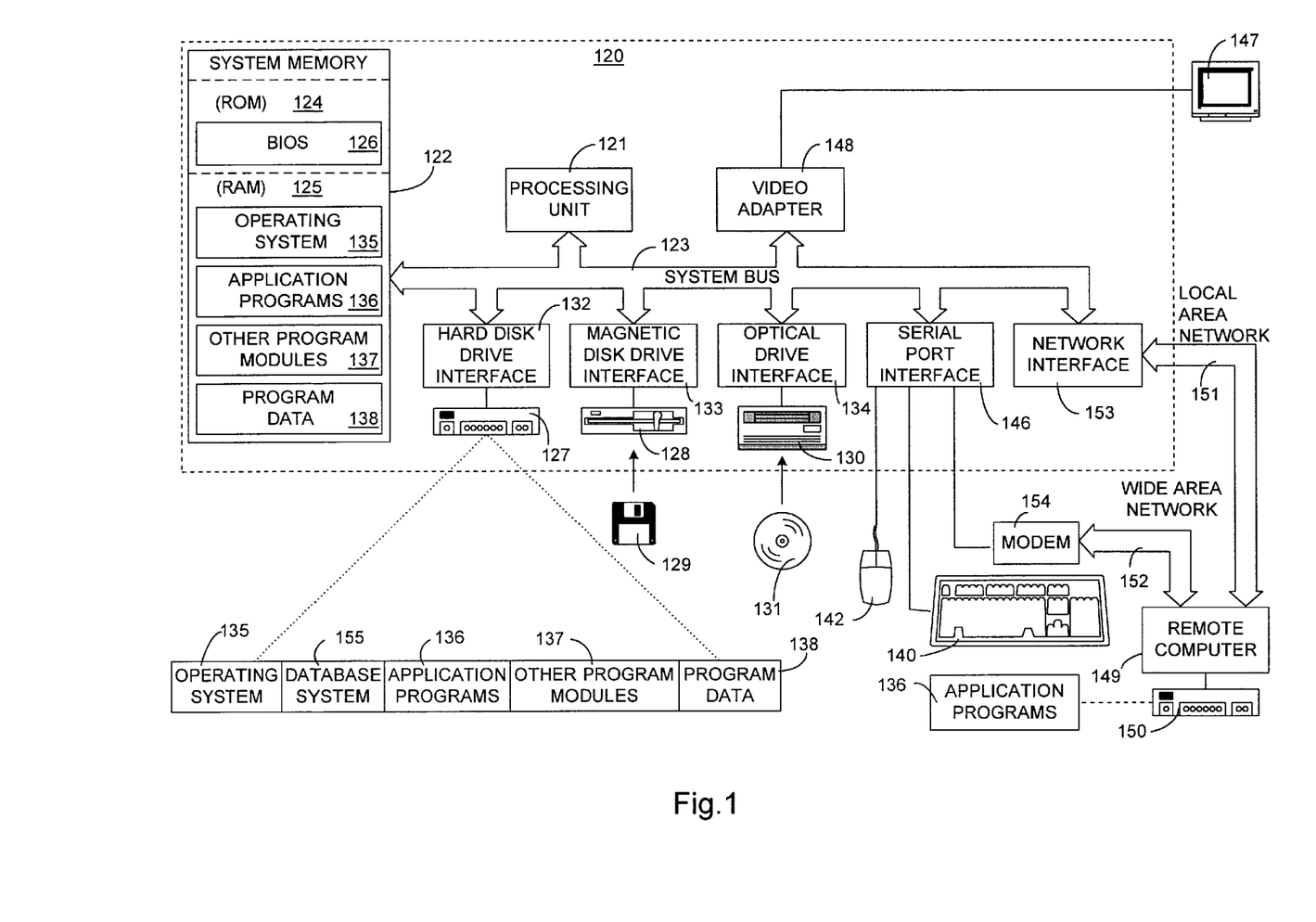
FIG. 1 illustrates an exemplary operating environment for directing discussion in an asynchronous messaging system.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 124 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, containing the basic routines that help to transfer information between elements within personal computer 120, such as during start-up, is stored in ROM 124. Personal computer 120 further includes a hard disk drive 127 for reading from and writing to a hard disk, a magnetic disk drive 128 for reading from or writing to a removable magnetic disk 129 and an optical disk drive 130 for reading from or writing to a removable optical disk 131 such as a CD ROM or other optical media. Hard disk drive 127, magnetic disk drive 128, and optical disk drive 130 are connected to system bus 123 by a hard disk drive interface 132, a magnetic disk drive interface 133, and an optical drive interface 134, respectively. The drives and their associated computer-readable media provide nonvolatile storage of computer-readable instructions, data structures, program modules and other data for personal computer 120. Although the exemplary environment described herein employs a hard disk, a removable magnetic disk 129 and a removable optical disk 131, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into personal computer 120 through input devices such as a keyboard 140 and pointing device 142. Other input devices may include a microphone, joystick, game pad, satellite dish, scanner, or the like. These and other input devices are often connected to processing unit 121 through a serial port interface 146 that is coupled to system bus 123, but may be connected by other interfaces, such as a parallel port, game port or a universal serial bus (USB). A monitor 147 or other type of display device is also connected to system bus 123 via an interface, such as a video adapter 148. In addition to the monitor, personal computers typically include other peripheral output devices such as speakers and printers.

Personal computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to personal computer 120, although only a memory storage device 150 has been illustrated in FIG. 1. The logical connections depicted in FIG. 1 include local area network (LAN) 151 and a wide area network (WAN) 152. Such networking environments are commonplace in offices, enterprise-wide computer networks, intranets, and the Internet.

When using a LAN networking environment, personal computer 120 is connected to local network 151 through a network interface or adaptor 153. When used in a WAN networking environment, personal computer 120 typically includes a modem 154 or other means for establishing communication over wide area network 152, such as the Internet. Modem 154, which may be internal or external, is connected to system bus 123 via serial port interface 146. In a networked environment, program modules depicted relative to personal computer 120, or portions thereof, may be stored in remote memory storage device 150. It will be appreciated that the network connections shown are exemplary and other means of establishing a communications link between the computers may be used.

Messaging System

Figure 2:
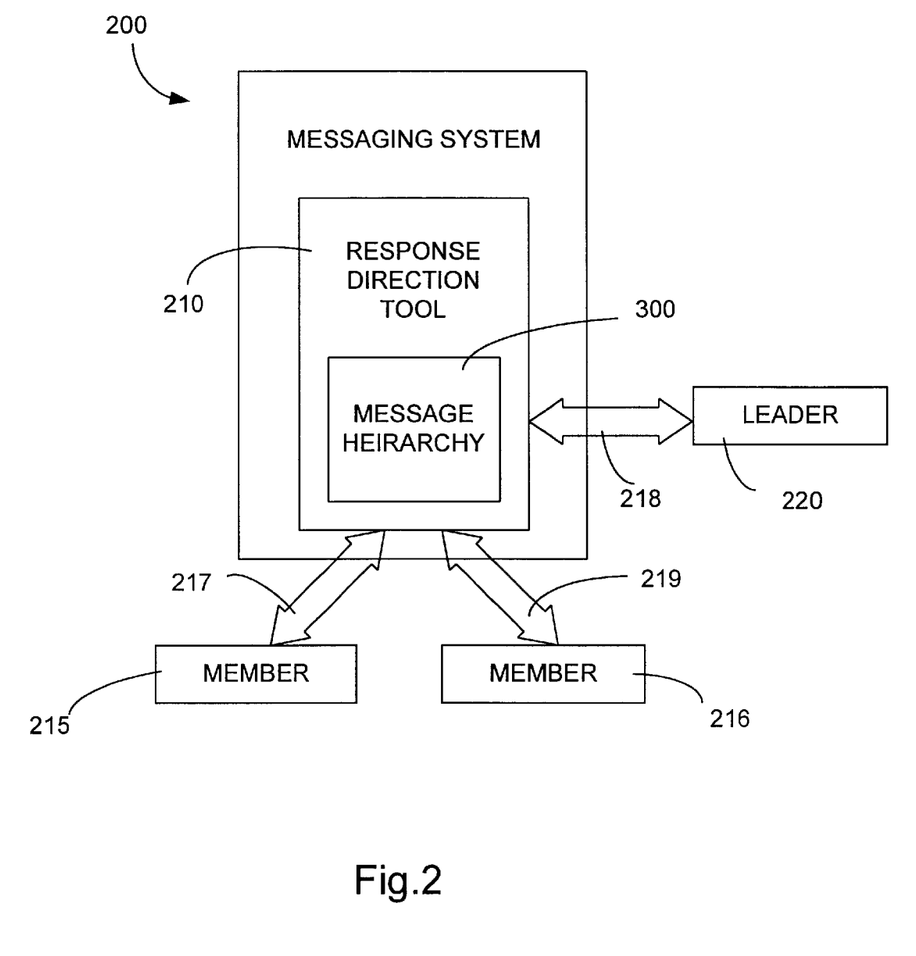
FIG. 2 illustrates a block diagram for an asynchronous messaging system of an embodiment of the present invention.

Referring now to FIG. 2, a messaging system 200 is depicted that features a response direction tool 210. Project team members 215,216 send and receive electronic messages 217,219 via the messaging system 200. The messages relate to a given project that progresses along a time line to completion. A team leader 220 also sends and receives messages 218 via the messaging system. Messages 217,218, 219 are stored in a message hierarchy 300 within the messaging system. A response direction tool 210 accesses the message hierarchy 300 and interfaces with the members 215,216. The team leader 220 controls the response direction tool 210.

Figure 3:
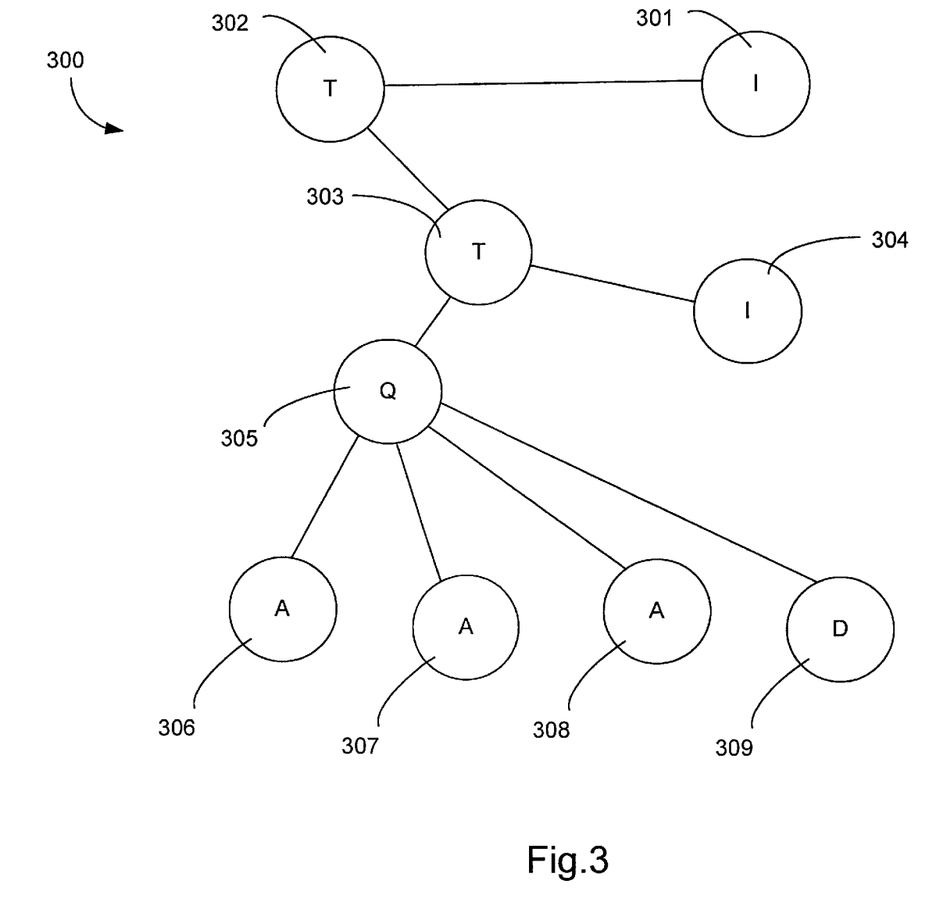
FIG. 3 illustrates an example message hierarchy.

FIG. 3 depicts a representation of a message hierarchy 300. Messages that have been posted in the messaging system 200 are catalogued by the leader 220 into a message hierarchy tree structure 300 wherein messages are represented by nodes 301–309. Related messages are represent by nodes that are connected such as node 305 and its sub-nodes 306–309. In general, nodes are added to the hierarchy at the edges or leaves. But is its also possible to insert between an exist nod and that node's parent.

The nodes are assigned a type and a goal by the leader 220 by communicating with the response direction tool 210. The response direction tool accesses the hierarchy 300 to complete the assignment. The type and goal assigned to a node define the types of responses to the message represented by the node that will be deemed acceptable by the response direction tool 210. As a project progresses, the team leader changes the node goal to tailor the responses to ones that expedite completion of the project. Generally, the further a project moves toward completion, the more limited the desired responses from team members. By limiting the types of responses, the response direction tool 210 can prevent the introduction of new ideas and proliferation of discussion that may set a project back when a decision is necessary. The response direction tool 210 screens the members' messages 217,219 and limits them to those recommended by the node type and goal of the message at hand. In an exemplary embodiment, the response direction tool 210 displays a cautionary message when an inappropriate response is received from a member 215,216, but does not prevent the member from sending the message.

Figure 6:
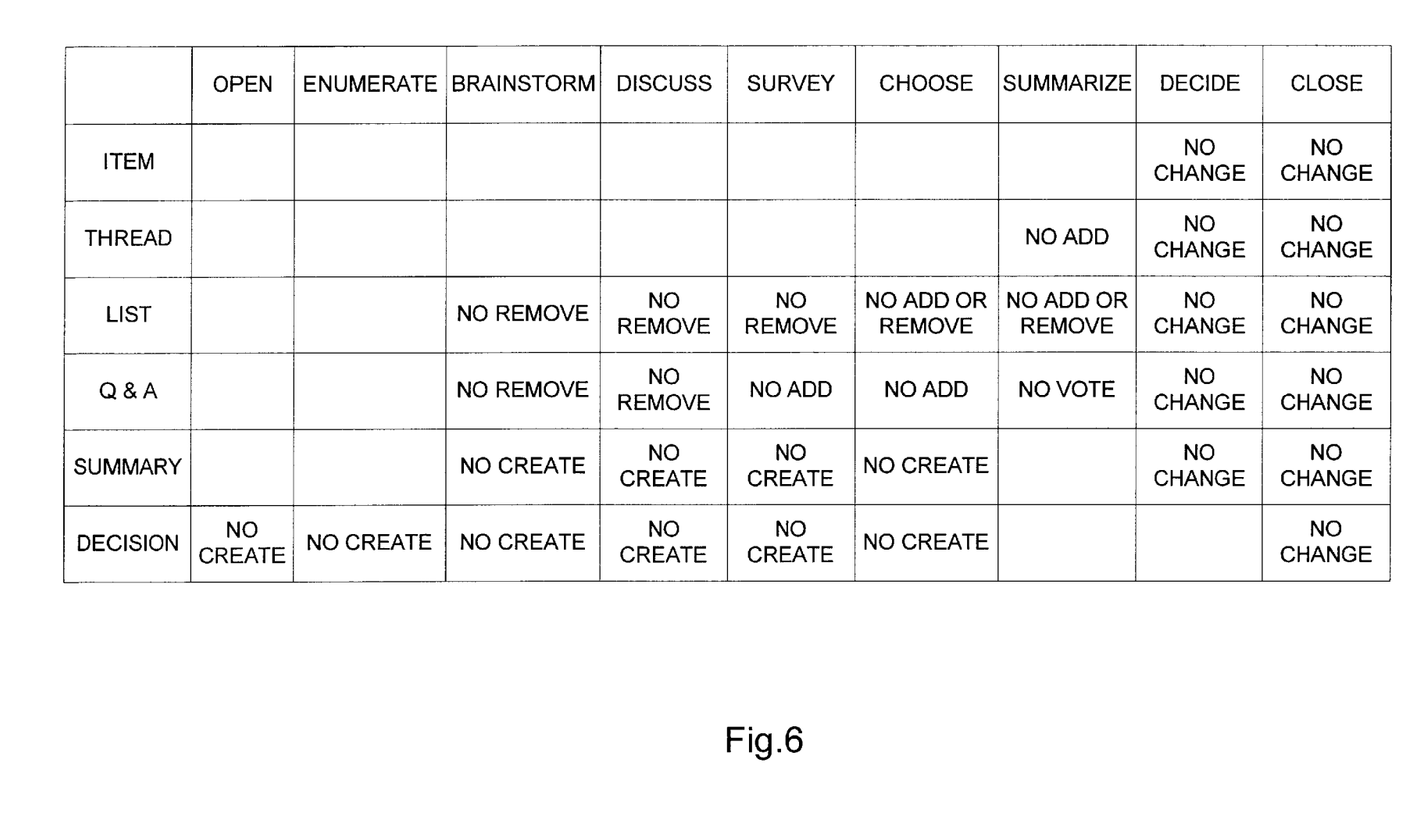
FIG. 6 illustrates a chart of node types and goals for an embodiment of the present invention.

FIG. 6 is a chart representation of the node types and goals that are used with an exemplary embodiment of the present invention. The vertical axis of the chart is the node type. The node type is assigned by the leader and defines how the node fits into the message hierarchy 300. For example, item type nodes are treated as stand alone messages that require no response. Thread type nodes invite some sort of response, possibly an open-ended text message. List nodes are configured such that their sub-nodes form a list. Similarly, question and answer nodes have sub-nodes that are answers to the question posed in the question and answer node, and the answers are summarized in the question and answer node. Summary nodes contain a summary of the information contained in the sub-node. Decision nodes are a type of item node that emphasize that a decision is to be reached. The node types in FIG. 3 are denoted by the letter within the node. For example, nodes 301, 304 are item type nodes; nodes 302, 303 are thread type nodes; node 305 is a question type node, nodes 306–308 are answer type nodes; and node 309 is a decision node.

The horizontal axis of the chart of FIG. 6 lists the goals that can be assigned to nodes according to an exemplary embodiment of the present invention. The goals loosely track the ordinary course of a project from open-ended discussion to close. The leader will change the goal of a node as the task of the node moves toward completion. If a node does not have a goal specifically assigned to it, it will inherit the goal from its parent. The leader is guided in setting the goal of a node. For example, the leader is discouraged from setting a sub-node's goal to be less advanced than its parent's goal, or to advance a super-node's goal if its sub-node goals are not yet at that point.

A node having an open goal generally allows open discussion. A goal of enumerate indicates that the node is for listing tasks, goals, etc. A brainstorming node allows free-form discussion. A discuss node is directed at discussing ideas and alternatives. A survey node collects information and a choose node is directed at selecting between a set of existing alternatives. A summarize node is directed at summarizing an existing discussion. A decide node encourages a final decision and a close node indicates a completed item or task.

The grid of FIG. 6 shows response operations that will be discouraged by the messaging system of the present invention as a function of the type and goal of the node representing a message to be responded to by a member. For example, in a question and answer (Q & A) type node having a brainstorm goal members will be discouraged from removing items from the list thereby allowing all ideas to be given consideration. Conversely, in a Q & A type node having a goal of choose, members will be discouraged from adding the list contents thereby facilitating a resolution of the question from existing alternatives.

Figure 4:
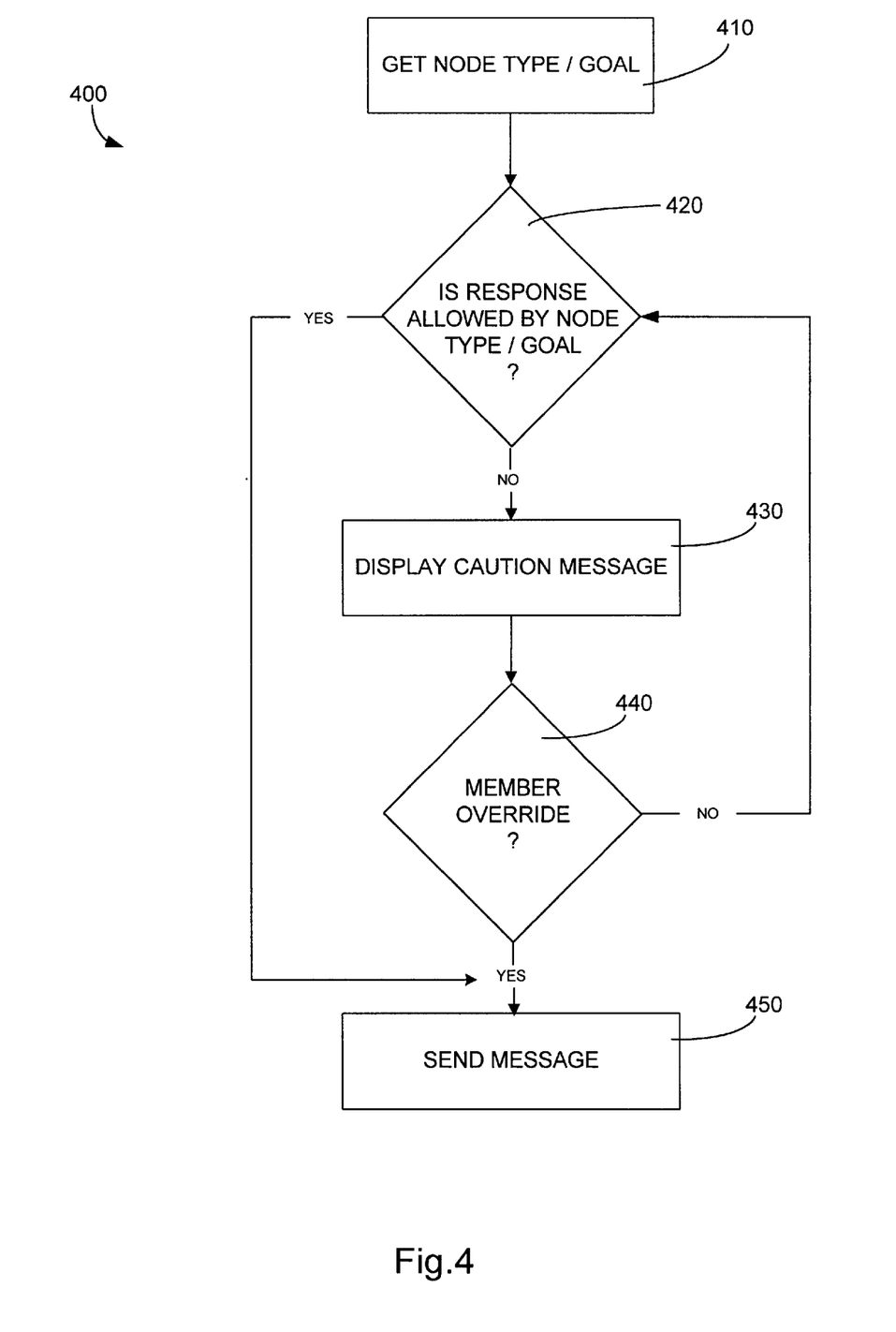
FIG. 4 illustrates a flow diagram for an asynchronous messaging system of an embodiment of the present invention.

FIG. 4 is a flow diagram 400 of the operation of the response direction tool 210 (FIG. 2). Upon receipt of a member message, the response direction tool 210 gets the node type and goal for the message to which the member is responding in step 410. In step 420 based on the type and goal, the response direction tool determines if the member's response performs operations that are to be discouraged (refer to discussion regarding FIG. 6). If the response does not perform discouraged operations, the message is sent to the messaging system to be posted in step 450. If the member's response performs discouraged operations a cautionary message is displayed in step 430. The message (not shown) would alert a member that they are attempting to respond in an inappropriate manner. In an exemplary embodiment, a member could override the cautionary message (step 440) and have the response posted anyway.

Figure 5:
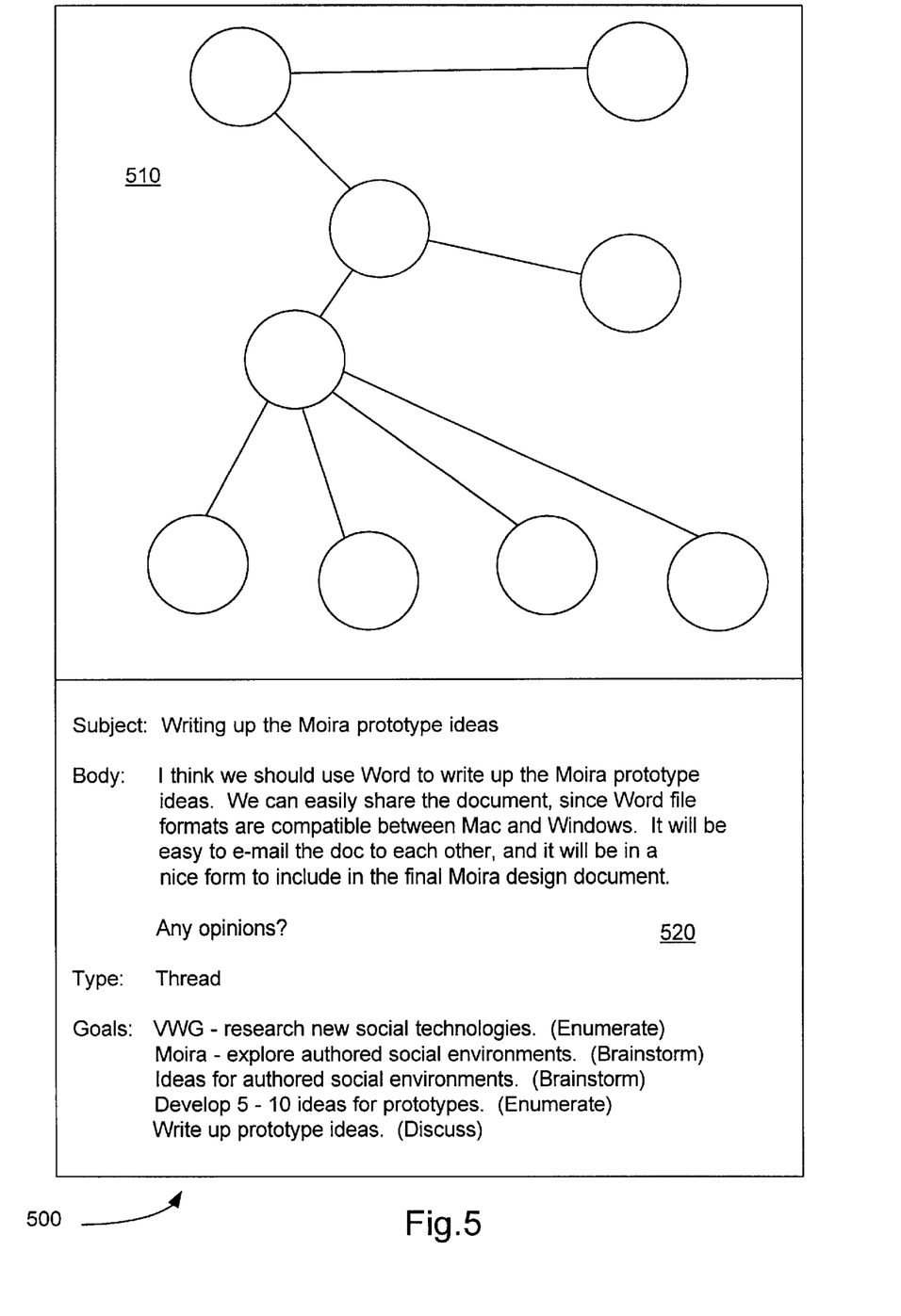
FIG. 5 illustrates an example user interface screen for an embodiment of the present invention.

FIG. 5 illustrates, for one embodiment, a user interface screen 500 that features a text section 520 and a hierarchy display window 510. The text section presents the message contents along with goal and type information to member. The hierarchy window 510 displays the contextual message hierarchy so that a member may view where the message fits into the overall scheme of the project. A member creates bookmarks (not shown) to link to nodes of particular interest and the system creates a set of bookmarks that link to nodes that have changed since the last time the member viewed them.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather that a restrictive sense.

I claim:

1. In a computer messaging system, a method of directing discussion in the form of electronic messages between members of a team as the discussion progresses toward a predetermined goal, wherein the team comprises a team leader and team members, the method comprising the steps of:

arranging the messages into a message hierarchy wherein related messages are represented by nodes and associated sub-nodes;

providing a response framework for responding to at least one of the messages represented by the nodes and associated sub-nodes, wherein the framework defines a goal for the node and a set of response types allowed for the node that are communicated to a team member responding to the node; and wherein the team leader can modify the response framework for a given node to alter the types of responses allowed for the node based on the progression of the discussion related to the node as the discussion progresses toward resolution of the goal for the node.

2. The method of claim 1 comprising the step of assigning a node type to the nodes and associated sub-nodes and wherein the node type determines how the message represented by the node fits into the message hierarchy.

3. The method of claim 1 wherein a message requiring a response is represented by a node and the associated sub-nodes of the node represent responses to the message.

4. The method of claim 1 wherein the framework is communicated by a pop-up screen that indicates that a proposed response is not a recommended response action.

5. The method of claim 1 comprising the step of displaying the message hierarchy for view by team members.

6. The method of claim 5 wherein the display of the message hierarchy is associated with a message being viewed by a team member and wherein the display includes information about where the message being viewed fits into the message hierarchy.

7. The method of claim 1 wherein the response framework comprises a set of recommended response operations that can be performed by the member.

8. The method of claim 7 wherein the team leader modifies the response framework based on a stage of the discussion as it progresses toward the goal.

9. The method of claim 1 comprising the step of interfacing with an external project timing system.

10. The method of claim 9 wherein the step of interfacing with an external project timing system is performed by determining a status of the discussion from the response framework and comparing the status to a set of milestones established for the discussion in the project timing system.

11. In a computer messaging system, having messages that are arranged into a message hierarchy wherein related messages are represented by nodes and associated sub-nodes, a method of facilitating a discussion consisting of an exchange of electronic messages between members of a team including a team leader comprising the steps of:
    providing a means for the leader to assign a node goal to at least one of the nodes, wherein the node type is chosen from a set of discussion stages ranging from an initial stage to a final stage;
    determining a response framework based on the assigned goal wherein the framework includes a set of allowed response types;
    directing a response from a member to the at least one of the nodes based on the response framework; and
    wherein the response framework is modified to alter the types of responses allowed as the discussion progresses.

12. The method of claim 11 comprising the step of providing a means for the leader to assign a node type to at least one of the nodes and wherein the type determines the manner in which the node functions within the node hierarchy.

13. The method of claim 12 wherein the step of directing a response from a member is performed by evaluating a proposed response of the member based on the response framework and alerting the member if the proposed response is not proper based on the evaluation.

14. The method of claim 11 comprising the step of displaying the message hierarchy associated with a message being viewed by a team member and wherein the display includes information about where the message being viewed fits into the message hierarchy.

15. The method of claim 14 further comprising the step of creating bookmarks for use with the hierarchy display that link to nodes that have been updated.

16. A computer-readable medium having computer executable instructions for performing a method of directing discussion in the form of electronic messages in a computer messaging system between members of a team as the discussion progresses toward a predetermined goal, wherein the team comprises a team leader and team members, the method comprising the steps of:
    arranging the messages into a message hierarchy wherein related messages are represented by nodes and associated sub-nodes;
    providing a response framework for responding to at least one of the messages represented by the nodes and associated sub-nodes, wherein the framework defines a goal for the node and a set of response types allowed for the node that are communicated to a team member responding to the node; and
    wherein the team leader can modify the response framework for a given node to alter the types of responses allowed for the node based on the progression of the discussion related to the node as the discussion progresses toward resolution of the goal for the node.

17. The computer readable medium of claim 16 comprising computer executable instructions for performing the step of assigning a node type to the nodes and associated sub-nodes and wherein the node type determines how the message represented by the node fits into the message hierarchy.

18. The computer readable medium of claim 16 wherein the framework is communicated by a pop-up screen that indicates that a proposed response is not a recommended response action.

19. The computer readable medium of claim 16 comprising computer executable instructions for performing the step of displaying the message hierarchy for view by team members.

20. A computer readable medium having computer executable instructions for facilitating a discussion consisting of an exchange of electronic messages between members of a team including a team leader in a computer messaging system, having messages that are arranged into a message hierarchy wherein related messages are represented by nodes and associated sub-nodes, the executable instructions performing the steps of:
    providing a means for the leader to assign a node goal to at least one of the nodes, wherein the node type is chosen from a set of discussion stages ranging from an initial stage to a final stage;
    determining a response framework based on the assigned goal wherein the framework includes a set of allowed response types;
    directing a response from a member to the at least one of the nodes based on the response framework; and
    wherein the response framework is modified to alter the types of responses allowed as the discussion progresses.

21. The computer readable medium of claim 20 comprising computer executable instructions for performing the step of providing a means for the leader to assign a node type to at least one of the nodes and wherein the type determines the manner in which the node functions within the node hierarchy.

22. The computer readable medium of claim 21 wherein the step of directing a response from a member is performed by evaluating a proposed response of the member based on the response framework and alerting the member if the proposed response is not proper based on the evaluation.

23. An apparatus for directing discussion in the form of electronic messages in a computer messaging system between members of a team as the discussion progresses toward a predetermined goal, wherein the team comprises a team leader and team members, the apparatus comprising:

means for arranging the messages into a message hierarchy wherein related messages are represented by nodes and associated sub-nodes;

means for providing a response framework for responding to at least one of the messages represented by the nodes and associated sub-nodes, wherein the framework defines a goal for the node and a set of response types allowed for the node that are communicated to a team member responding to the node; and wherein the team leader can modify the response framework for a given node to alter the types of responses allowed for the node based on the progression of the discussion related to the node as the discussion progresses toward resolution of the goal for the node.

24. The apparatus of claim 23 comprising means for assigning a node type to the nodes and associated sub-nodes and wherein the node type determines how the message represented by the node fits into the message hierarchy.

25. The apparatus of claim 23 wherein the framework is communicated by a pop-up screen that indicates that a proposed response is not a recommended response action.

26. The apparatus of claim 23 comprising means for displaying the message hierarchy for view by team members.

27. An apparatus for facilitating a discussion consisting of an exchange of electronic messages between members of a team including a team leader in a computer messaging system, having messages that are arranged into a message hierarchy wherein related messages are represented by nodes and associated sub-nodes, the apparatus comprising:

means for providing a means for the leader to assign a node goal to at least one of the nodes, wherein the node type is chosen from a set of discussion stages ranging from an initial stage to a final stage;

means for determining a response framework based on the assigned goal wherein the framework includes a set of allowed response types;

means for directing a response from a member to the at least one of the nodes based on the response framework; and wherein the means for determining the response framework modifies the framework to alter the types of responses allowed as the discussion progresses.

28. The apparatus of claim 27 means for providing a means for the leader to assign a node type to at least one of the nodes and wherein the type determines the manner in which the node functions within the node hierarchy.

29. The apparatus of claim 27 wherein the means for directing a response from a member evaluates a proposed response of the member based on the response framework and alerts the member if the proposed response is not proper based on the evaluation.

* * * * *

UNITED STATES PATENT AND TRADEMARK OFFICE
CERTIFICATE OF CORRECTION

PATENT NO. : 6,708,201 B1
DATED : March 16, 2004
INVENTOR(S) : Harry Chesley It is certified that error appears in the above-identified patent and that said Letters Patent is hereby corrected as shown below:

Column 10,
Line 18, "The apparatus of claim 27 means" should read -- The apparatus of claim 27 wherein the means --.

Signed and Sealed this

Thirteenth Day of July, 2004

JON W. DUDAS
*Acting Director of the United States Patent and Trademark Office*